United States Patent [19]

Funabashi et al.

[11] Patent Number: 4,814,307

[45] Date of Patent: Mar. 21, 1989

[54] PROCESS FOR PRODUCING AN ELECTRODE SUBSTRATE WHICH IS UNIFORM IN PHYSICAL PROPERTIES

[75] Inventors: Masayuki Funabashi; Masayosi Sibuya, both of Iwaki, Japan

[73] Assignee: Kureha Kagaku Kogyo Kabushiki Kaisha, Tokyo, Japan

[21] Appl. No.: 67,827

[22] Filed: Jun. 30, 1987

[30] Foreign Application Priority Data

Jul. 14, 1986 [JP] Japan ................ 61-165243

[51] Int. Cl.$^4$ .................... H01M 4/96; C01B 31/02; D01F 9/12
[52] U.S. Cl. ................... 502/101; 204/294; 264/29.5; 429/40; 429/42; 429/44
[58] Field of Search .......... 502/101, 418; 264/29.5, 264/105; 429/40, 44, 42; 204/294

[56] References Cited

U.S. PATENT DOCUMENTS

| | | | |
|---|---|---|---|
| 3,829,327 | 8/1974 | Omori | 117/226 |
| 3,960,601 | 6/1976 | Schultz | 136/130 |
| 3,991,169 | 11/1976 | Makita et al. | 423/445 |
| 3,998,689 | 12/1976 | Kitago et al. | 162/136 |
| 4,198,382 | 4/1980 | Matsui | 423/445 |
| 4,225,569 | 9/1980 | Matsui et al. | 423/445 |
| 4,228,037 | 10/1980 | Hino et al. | 264/29.5 |
| 4,506,028 | 3/1985 | Fukuda et al. | 502/418 |
| 4,666,755 | 5/1987 | Shigeta et al. | 428/188 |
| 4,687,607 | 8/1987 | Shigeta et al. | 429/44 |

FOREIGN PATENT DOCUMENTS

2000489 A 1/1979 United Kingdom .
2182918 A 8/1986 United Kingdom .

*Primary Examiner*—Paul E. Konopka
*Attorney, Agent, or Firm*—Nixon & Vanderhye

[57] ABSTRACT

Disclosed herein are a process for producing an electrode substrate, which process comprises the steps of kneading a raw material mixture comprising from 30 to 60% by weight of short carbon fibers, from 20 to 50% by weight of a phenol resin binder and from 20 to 50% by weight of a molding additive, extruding the thus kneaded raw material mixture and after press-molding the thus extruded material by rolling or stamping, calcining the thus press-molded material in an inert atmosphere and/or under a reduced pressure and the electrode substrate produced by the above-mentioned process.

9 Claims, No Drawings

PROCESS FOR PRODUCING AN ELECTRODE SUBSTRATE WHICH IS UNIFORM IN PHYSICAL PROPERTIES

BACKGROUND OF THE INVENTION

The present invention relates to a process for producing an electrode substrate, and more specifically, relates to a process for continuously producing an electrode substrate having uniform physical properties, particularly an electrode substrate for fuel cells at a low cost and a favorable productivity, and the electrode substrate obtained by the above-mentioned process.

Various processes have been proposed for producing an electrode substrate for fuel cells, etc. For instance, a process of subjecting dispersed carbon fibers to paper-manufacturing (refer to U.S. Pat. No. 3,998,689) and a process of chemical vapor depositing thermally decomposed carbon onto a web of carbon fibers (refer to U.S. Pat. No. 3,829,327) have been proposed.

There has also been proposed a process wherein an alcohol having a boiling point of higher than 150° C. is used as a preparatory binder for forming a mat of pitch fibers and then the mat of pitch fibers is subjected to carbonization and heat-treatment in a non-oxidative atmosphere (refer to U.S. Pat. No. 3,991,169).

Other processes are known wherein a web comprising pitch fibers produced by blow-spinning are subjected to infusibilization and carbonization, thereby obtaining a web of carbon fibers (refer to U.S. Pat. No. 3,960,601).

A process for producing an electrode substrate for a fuel cell of monopolar type has been proposed, which comprises the steps of press-molding a mixture comprising short carbon fibers as the base, a carbonaceous resin binder such as a phenol resin and organic granules as the pore regulator, such as polyvinyl alcohol, polyethylene and polypropylene and calcining the thus press-molded body, has been proposed (refer to U.S. Pat. No. 4,506,028 and U.S. Pat. No. 4,666,755).

Although various electrode substrates have been produced by the above-mentioned processes, it is very difficult to have uniform physical properties all over the electrode substrate.

Namely, although the electrode substrate takes a thinplate form in general, the values of physical properties measured on the various points of the flat surface of the electrode substrate show fluctuation.

For instance, in the case where the compound containing the carbon fibers as the base material is supplied to a metal mold and is subjected to press-molding or rollmolding, the occurrence of an uneven supply of the compound is inevitable. As a result, the physical properties of the thus obtained electrode substrate are not uniform.

Particularly, in the case where the value of the bending strength of the electrode substrate fluctuates, there is a possibility that the electrode substrate may break during handling. And, in the case where the bulk density of the electrode substrate is uneven, portions of large thermal resistance and electric resistance occur. Furthermore, in the case where the value of thermal resistance fluctuates, portions of the substrate are locally heated to high temperatures to deleteriously accelerate the sintering of the catalyst thereby reducing the electrode's useful life.

Still more, in the case where the gas-permeability of the electrode substrate is uneven, since the resistance to the diffusion of reactant gas becomes uneven, there is a problem that the output specificity varies locally.

Since there is a limit in the productivity of electrode substrates by a non-continuous process (such as the above-mentioned press-process, it would be very desirable for a process to be provided which continuously produces electrode substrates at a favorable productivity.

As one such process for continuously producing electrode substrates, the extruding process is a possibility. However, the conventional compound for pressmolding, which comprises carbon fibers and a binder, exhibits poor fluidity and accordingly cannot be extruded.

In consideration of the above-mentioned situations, the present inventors have studied the process for continuously producing an electrode substrate of the uniform physical properties. As a result, it has been found that both the kneadability and the fluidity of a compound consisting of short carbon fibers and a binder are improved by mixing a molding additive with the compound. Accordingly, it is now possible with this invention to extrude the thus treated compound via extrusion processing technique. On the basis of their findings, the present inventors have arrived at the present invention.

Accordingly, one object of the present invention is to provide a process for continuously producing an electrode substrate having uniform physical properties at favorable production rates.

Further, another object of the present invention is to provide an electrode substrate which can be continuously produced and accordingly, can be produced at significantly reduced costs and which has uniform and favorable physical properties.

SUMMARY OF THE INVENTION

In a first aspect of the present invention, there is provided a process for producing an electrode substrate, which process comprises the steps of kneading a raw material mixture comprising from 30 to 60 % by weight of short carbon fibers, from 20 to 50 % by weight of a phenol resin binder and from 20 to 50 % by weight of a molding additive, extruding the thus kneaded raw material mixture and after press-molding the thus extruded material by rolling or stamping, calcining the thus press-molded material in an inert atmosphere and/or under a reduced pressure.

In a second aspect of the present invention, there is provided an electrode substrate having uniform physical properties, which electrode substrate has been produced by a process comprising the steps of kneading a raw material mixture comprising from 30 to 60 % by weight of short carbon fibers, from 20 to 50 % by weight of a phenol resin binder and from 20 to 50 % by weight of a molding additive, extruding the thus kneaded raw material mixture and after press-molding the thus extruded material by rolling or stamping, calcining the thus press-molded material in an inert atmosphere and/or under a reduced pressure.

DETAILED DESCRIPTION OF THE INVENTION

The present invention relates to a process for producing an electrode substrate, which process comprises the steps of kneading a raw material mixture comprising from 30 to 60 % by weight of short carbon fibers, from 20 to 50 % by weight of a phenol resin binder and from 20 to 50 % by weight of a molding additive, extruding the thus kneaded raw material mixture and after press-molding the thus extruded material by rolling or stamping, calcining the thus press-molded material in an inert atmosphere and/or under a reduced pressure, and an electrode substrate produced by the above process.

The process according to the present invention will be explained in detail as follows:

As the short carbon fibers used in the present invention, those having a fiber diameter of from 5 to 30 micrometers and a fiber length of from about 0.05 to about 2 mm are desirable. In the case where the fiber length is over 2 mm, the fibers entwine each other during the steps up to molding to form hair ball-like bodies and it is impossible to obtain the electrode substrate having the desired bulk density and distribution of the pore diameter. On the other hand, in the case where the fiber length is below 0.05 mm, the necessary strength of the electrode substrate cannot be obtained.

Further, in the case where the above-mentioned short carbon fibers are calcined at 2000° C. in an inert atmosphere and/or under a reduced pressure, the carbonizing linear shrinkage of the short carbon fiber is preferably not more than 3.0%. In the case where the carbonizing linear shrinkage is over 3.0%, there is a fear that the large linear shrinkage becomes one of the causes of generating the cracks in the product at the time of calcination. By using the short carbon fibers shown as above, it is possible to produce an electrode substrate of particularly large in size.

The binder used in the present invention is useful after carbonization thereof as the carbonaceous binding material for binding the carbon fibers one another, and in order to obtain the desired bulk density of the electrode substrate, a phenol resin having a carbonizing yield in the range of from 30 to 75% by weight is used for the purpose.

According to the present invention, both the kneadability and fluidity of the raw material mixture are improved by mixing a molding additive with a mixture of the above-mentiond short carbon fibers and phenol resin binder. As such a molding additive, a substance generally used in the field of processing plastics can be used; however, the amount of carbon fibers contained in the fiber-reinforced plastic recently commerciallized as the extrusion-molded products is at most 30% by weight, and the extrusion-molded products containing not less than 30% by weight of the carbon fibers according to the present invention have not been yet known.

As the molding additive used according to the present invention, an organic high polymer having a carbonizing yield of not more than 5% by weight is preferably used. As the organic high polymer, copolymers of ethylene and vinyl acetate (hereinafter referred to as EVA) or mixtures of EVA and polyolefin may be exemplified. The polyolefin is preferably mixed in the range of not more than 100 parts by weight with 100 parts by weight of EVA, more preferably mixed in the range of not more than 70 parts by weight with 100 parts by weight of EVA. The carbonizing yield of the mixture of EVA and the polyolefin is preferably not more than 5% by weight. As the above-mentioned polyolefin, polyethylene is preferable. As the above-mentioned molding additive, those which do not volatilize until the temperature reaches 100° C. are used. Namely, the thermal deformation and the melt flow of the above-mentioned molding additive is allowed at the extruding temperature and under the extruding pressure; however, the molding additive should not volatilize under the thus conditions.

The above-mentioned raw material mixture comprises from 30 to 60% by weight, preferably from 35 to 50% by weight of short carbon fibers, from 20 to 50% by weight, preferably from 25 to 40% by weight of a phenol resin binder and from 20 to 50% by weight, preferably from 25 to 40% by weight of a molding additive.

The above-mentioned raw material mixture is supplied to an extruder and is kneaded therein under desirable conditions of a temperature of not higher than 110° C. and a kneading time (a retention time of the raw material mixture in the extruder of not longer than about 10 min. After kneading the raw material mixture under the above-mentioned conditions, the thus kneaded mixture is extruded out through a T-die.

Although the extruding speed in this case depends on the type and size of the extruder, the kneaded raw material mixture is extruded generally at a rate of from 10 to 100 kg/hour.

After heating the thus extruded material to from 130° to 180° C., the thus heated material is molded under a pressure of from 20 to 80 kgf/cm$^2$ by rolling or stamping. In this case, by suitably selecting the shape of the roll or the stamp, it is possible to obtain the press-molded material of the desired shape. For instance, by providing concaves and convexes on the surface of the roll, it is possible to produce the ribbed electrode substrate.

The molded material obtained as above is calcined for about one hour at a temperature of from 800° to 3000° C. in an inert atmosphere and/or under a reduced pressure. In this case, it is desirable that the temperature of the molded material is slowly raised up to about 700° C., for instance, at a rate of 100°±50° C./hour in the step of thermal decomposition at low temperatures, thereby preventing the generation of stress due to rapid shrinkage of the molded material at the time of gasification. In the case of raising rapidly the temperature of the molded material in the above-mentioned step of thermal decomposition at low temperatures, such an action becomes the cause of interlayer exfoliation and generation of cracks in the product.

The physical properties of the thus obtained electrode substrate are uniform all over the electrode substrate and moreover, the thus obtained electrode substrate has the same or the better values of physical properties as compared to those of the conventional press-molded products.

The descriptions of "uniform in physical properties" and "little in fluctuation of the values of physical properties" in the present invention mean that a fluctuation (R) of the values of physical properties in the product of the present invention is less than that in the conventional product, when each of the physical properties of the electrode substrate is measured at the various points of the specimen of the electrode substrate as will be examplified in Example later, and the difference between the maximum value and the minimum value of the physical property is considered as the fluctuation (R).

The physical properties of the electrode substrate mentioned as above particularly indicate the bulk density, the gas-permeability and/or the bending strength.

The reason of the substantial reduction of the fluctuation of the values of physical properties of the thus obtained electrode substrate depends on the process according to the present invention, wherein a molding additive is mixed with the raw material mixture comprising short carbon fibers and a binder, each component of the thus formed mixture is sufficiently kneaded to obtain a raw material mixture having a remarkably improved fluidity, the thus obtained raw material mixture is extruded without unevenness in supply and the thus extruded material is press-molded by rolling or stamping.

Since the above-mentioned process according to the present invention can be carried out continuously, for instance, the productivity of the electrode substrate is remarkably improved as compared to that of the non-continuous process of press-molding by metal mold, and as a result, a remarkable reduction of the production cost of the electrode substrate can be expected.

The electrode substrate having the uniform physical properties obtained according to the process of the present invention is useful, for instance, as the electrode substrate for fuel cells.

In particular, since the bending strength of the thus produced electrode substrate is uniform at the various point thereof, there are little fear of damage of the electrode substrate in the handling thereof.

Further, since there are no fluctuation in the value of the bulk density of the thus obtained electrode substrate, any local unevenness in the thermal resistance and the electric resistance of the electrode substrate does not occur and as a result, the life thereof as an electrode is prolonged. Still more, since there is no fluctuation in the value of the gas-permeability of the thus obtained electrode substrate, there is an effect of showing the uniform output specificity.

The present invention will be described in detail while referring to the non-limitative Example as follows:

EXAMPLE

Three kinds of electrode substrates(A, B and C) were produced as follows:

(A):

A raw material mixture comprising (1) 45% by weight of short carbon fibers (made by KUREHA KAGAKU KOGYO Co., Ltd. under the product No. of M 104, 14 micrometers in mean fiber diameter and 0.4 mm in mean fiber length), (2) 30% by weight of a phenol resin (made by ASAHI YUKIZAI Co., Ltd. under the product No. of RM-210 and (3) 25% by weight of an EVA resin (EVAFLEX ® 7050, made by MITSUI-Du Pont Co., Ltd.) was dry-blended and then pelletized by a pelletizer, and the thus obtained pellets were supplied to an extruder (made by NIHON SEIKOSHO under the product No. P90-22AB) while controlling the temperature of the metering zone at 90° C., and further extruded from a T-die maintained at 110° C.

After preliminarily heating the thus extruded material to 150° C. by an infra-red heater, the thus heated material is continuously supplied to the rolls heated to 170° C. The pressure between the rolls was made to be 20 kgf/cm².

The thus obtained, molded body was calcined for one hour at 2000° C. in an atmosphere of nitrogen to obtain an electrode substrate A.

(B):

A raw material mixture comprising (1) 45% by weight of the same short carbon fibers as in (A), (2) 30% by weight of the same phenol resin as in (A) and (3) a mixture of 20% by weight of the same EVA as in (A) and 5% by weight of a polyethylene (Hi-zex Powder ® S100EP, made by MITSUI Petrochemical Co., Ltd.) was dry-blended and then pelletized by the same pelletizer as in (A) to obtain the pellets.

An electrode substrate B was produced by using the thus obtained pellets in the same manner as in (A).

(C):

As a comparative example, an electrode substrate was produced by subjecting a mixture of (1) 45% by weight of the same short carbon fibers as in (A), (2) 30% by weight of the same phenol resin as in (A) and (3) 25% by weight of the same polyethylene as in (B) (which polyethylene was used as a pore regulator) to press-molding in the usual manner by a metal mold and calcining the thus obtained, molded body for one hour at 2000° C. in an atmosphere of nitrogen.

The physical properties of the thus produced three electrode substrates A, B and C were measured as follows, the results being shown later:

The measurement was carried out on each of the above-mentioned electrode substrates of 600 mm in leangth and width.

Namely, the bulk density ($\rho b$, g/cm³) was measured on 25 pieces of the specimen of 50 mm in length and width, which pieces had been cut from each of the electrode substrates. For that purpose lines parallel to the edge of the electrode substrate and to each other were at first drawn on the surface of each of the electrode substrates lengthwise and widthwise at an interval of 100 mm to obtain 25 inter-secting points as the measuring points, and the above-mentioned 25 pieces were cut out such that each of the above measuring points is located at the centre of each of the pieces. Before cutting out the above-mentioned pieces, the gas-permeability (ml/cm².hour.mmAq) of each of the electrode substrates was measured by applying a cup of 80 mm in diameter on each of the measuring point, flowing a predetermined amount of air and calculating the gas-permeability from the back pressure (it is publicly known that the back pressure is in proportion linearly to the gas-permeability in that case).

The bending strength (kgf/mm²) of each of the electrode substrate was measured by cutting out five pieces of specimen of 10 mm in length and 80 mm in width from the remaining part of each of the electrode substrates and carrying out the three-point bending test on the thus cut pieces according to Japanese Industrial Standards (JIS) K-6911.

The results of the measurement are shown in Table.

In Table, R is the difference between the maximum and the minimum of the thus measured values. As are seen in Table, R values of the physical properties of the electrode substrate produced according to the process of the present invention (A and B) are respectively about ⅔ and about ½ of those of the electrode substrate produced by the conventional process (C).

TABLE

| | according to the present invention | | | | conventional | |
|---|---|---|---|---|---|---|
| | Method of molding | | | | | |
| | Extruding and roll-molding | | | | press-molding by metal mold | |
| | Molding additive or pore regulator | | | | | |
| | EVA (Electrode substrate A) | | Mixture of EVA and polyethylene (Electrode substrate B) | | polyethylene (Electrode substrate C) | |
| | Mean value | R | Mean value | R | Mean value | R |
| Bulk density | 0.512 | 0.032 | 0.548 | 0.025 | 0.545 | 0.040 |
| Gas-permeability | 1,340 | 300 | 1,280 | 200 | 1,130 | 450 |
| Bending strength | 0.96 | 0.51 | 0.98 | 0.47 | 0.94 | 0.86 |

What is claimed is:

1. A process for continuously producing an electrode substrate, which process comprises the steps of:
   (1) kneading, at a temperature of not higher than 110° C. a raw material mixture comprising from 30 to 60% by weight of short carbon fibers, from 20 to 50% by weight of a phenol resin binder, and from 20 to 50% by weight of a molding additive of an organic high polymer having a carbonizing yield of not more than 5% by weight, said organic high polymer being selected from a copolymer resin of ethylene and vinyl acetate, and a mixture of a copolymer resin of ethylene and vinyl acetate and a polyolefin;
   (2) extruding the thus kneaded raw material mixture through an extrusion die;
   (3) thereafter heating the thus extruded raw material to a temperature of from 130° to 180° C., and press-molding the thus heated material under a pressure of from 20 to 80 kgf/cm$^2$ by rolling or stamping, and then
   (4) calcining the thus press-molded material for about one hour at a temperature of from 800° to 3000° C. in an inert atmosphere and/or under a reduced pressure, whereby said electrode substrate is formed.

2. A process according to claim 1, wherein the kneading of step (1) is practiced for not longer than 10 minutes.

3. A process according to claim 1, wherein said short carbon fibers have diameters of from 5 to 30 micrometers and lengths of from 0.05 to 2 mm, and wherein the carbonizing linear shrinkage of said short carbon fibers is not more than 3% when said short carbon fibers are calcined at 2000° C. in an inert atmosphere and/or under a reduced pressured.

4. A process according to claim 1, wherein the carbonizing yield of said phenol resin binder is from 30 to 75% by weight.

5. A process according to claim 1, wherein the mixture of a copolymer resin of ethylene and vinyl acetate and a polyolefin comprises 100 parts by weight of said copolymer resin of ethylene and vinyl acetate and not more than 100 parts by weight of said polyolefin.

6. A process according to claim 1, wherein said polyolefin is a polyethylene.

7. A process according to claim 1, wherein said raw material mixture comprises from 35 to 50% by weight of said short carbon fibers, from 25 to 40% by weight of said phenol resin binder and from 25 to 40% by weight of said molding additive.

8. A process according to claim 1, wherein step (3) is practiced so as to select a shape of the roll or stamp to produce a press-molded material of desired shape.

9. A process as in claim 1, wherein step (2) is practiced by extruding the kneaded raw material mixture through a T-shaped extrusion die.

* * * * *